United States Patent [19]
Fielding

[11] 3,923,902
[45] Dec. 2, 1975

[54] ALIPHATIC COMPOUNDS CONTAINING OXYGEN ATOMS

[75] Inventor: Harold Crosbie Fielding, Northwich, England

[73] Assignee: Imperial Chemical Industries Limited, London, England

[22] Filed: Dec. 30, 1970

[21] Appl. No.: 102,918

Related U.S. Application Data

[62] Division of Ser. No. 699,049, Jan. 19, 1968, Pat. No. 3,632,641.

[30] Foreign Application Priority Data

Jan. 23, 1967 United Kingdom................. 3361/67

[52] U.S. Cl. ........................................... 260/593 H
[51] Int. Cl.............................................. C07c 49/04
[58] Field of Search......... 260/593 R, 593 H, 585.5, 260/653.1

[56] References Cited
UNITED STATES PATENTS

| | | | |
|---|---|---|---|
| 2,802,034 | 8/1957 | Hauptschein | 260/593 H |
| 3,029,252 | 4/1962 | Simmons | 260/593 |
| 3,091,643 | 5/1963 | Wiley | 260/595 |

FOREIGN PATENTS OR APPLICATIONS

| | | | |
|---|---|---|---|
| 1,082,127 | 9/1967 | United Kingdom | 260/653 R |

*Primary Examiner*—Bernard Helfin
*Assistant Examiner*—James H. Reamer
*Attorney, Agent, or Firm*—Cushman, Darby & Cushman

[57] ABSTRACT

Oligomers of tetrafluoroethylene $(C_2F_4)_n$ where $n$ is 4 to 6 react at 25°–100°C with aqueous solutions of sodium or potassium hydroxides to give novel oxygen-containing derivatives in which the oxygen is located in hydroxyl, carbonyl or carboxyl groups. With 5–15% by weight solutions of the hydroxides the tetramer yields a tertiary alcohol; the pentamer yields the ketone $(C_2F_5)_2(CF_3)C.CH_2COCF_3$, and hexamer yields a mixture of the ketone $(C_4F_9)(C_2F_5)(CF_3)C.CH_2COCF_3$ and the ketene $(C_2F_5)_2(CF_3)C.C(CO).CF(CF_3)(C_2F_5)$. With 30–60% solutions the pentamer yields the acid $(C_2F_5)_2(CF_3)C.CH_2COOH$. These oligomer derivatives are intermediates for making surfactants and oleophobic compounds for application to textiles and leather.

3 Claims, No Drawings

ALIPHATIC COMPOUNDS CONTAINING OXYGEN ATOMS

This is a division of application Ser. No. 699,049, filed 1/19/68, now U.S. Pat. No. 3,632,641.

BACKGROUND OF THE INVENTION

1. Field aliphatic fluorine chemistry based on tetrafluoroethylene.

2. Prior art none directly pertinent known; some highly fluorinated long-chain aliphatic compounds are known to possess oleophobic properties.

SUMMARY OF THE INVENTION

Preparation of oxygen-containing derivatives of tetrafluoroethylene oligomers, in which the oxygen is combined in hydroxyl, carbonyl or carboxyl groups, by reacting oligomers with aqueous solutions of alkali metal hydroxides at 25°–100°C.

This invention relates to highly fluorinated compounds whose molecules contain oxygen atoms particularly to the preparation from oligomers of tetrafluoroethylene of highly fluorinated aliphatic acids, ketones, ketenes and alcohols.

In this specification the term oligomer means an internally unsaturated, branched-chain low polymer of tetrafluoroethylene having the empirical formula $(C_2F_4)_n$ where $n$ is an integer from 4 to about 12, particularly 4 to 6.

We have found that oligomers of tetrafluoroethylene react with aqueous solutions of alkali metal hydroxides. The initial reaction in all cases appears to be the replacement of a fluorine atom by a hydroxyl group to give an alcohol. After this further reactions can take place whose course is determined by the structure of the oligomer and the concentration of the aqueous alkali metal hydroxide solution, and they lead to the formation of highly fluorinated aliphatic acids, ketones and ketenes. When the oligomer is the tetramer the further reactions follow a slightly different course and the main product is an alcohol. The pentamer on the other hand gives an acid and a ketone whilst hexamer gives a ketene and a ketone.

In its general form the invention thus provides a process for making from tetrafluoroethylene oligomers derivatives whose molecules contain oxygen atoms combined in groups selected from hydroxyl, carbonyl and carboxyl groups, comprising reacting an oligomer with an aqueous solution of an alkali metal hydroxide.

In one particular form the invention provides a process for making from tetrafluoroethylene pentamer the perfluoroalkyl acetic acid $R_fCH_2COOH$ and the perfluoroalkylmethyl trifluoromethyl ketone $R_fCH_2COCF_3$, where $R_f$ represents the perfluoroalkyl group $(C_2F_5)_2(CF_3)C$, comprising reacting tetrafluoroethylene pentamer with respectively concentrated and dilute aqueous solutions of an alkali metal hydroxide.

In another particular form the invention provides a process for making from tetrafluoroethylene hexamer the perfluoroalkyl ketene $(R_f)(R^1_f)C=CO$ and the perfluoroalkylmethyl trifluoromethyl ketone $R^2_fCH_2COCF_3$, where $R_f$, $R^1_f$ and $R^2_f$ represent respectively the perfluoroalkyl groups $(C_2F_5)_2(CF_3)C$, $(C_2F_5)(CF_3)CF$ and $(C_4F_9)(C_2F_5)(CF_3)C$, comprising reacting tetrafluoroethylene hexamer mixed isomers $(C_2F_4)_6$ with dilute solutions of an alkali metal hydroxide and subsequently fractionating the reaction products to separate said ketene and ketone.

The terms dilute and concentrated in relation to the aqueous solutions of alkali metal hydroxides are such that the preferred strengths of the dilute solutions are from 5 to 15% and of the concentrated solutions 30 to 60% by weight. Minor amounts of the perfluoroalkyl acetic acid can be produced together with major amounts of the perfluoroalkylmethyl trifluoromethyl ketone even when dilute solutions of the hydroxides are reacted with the pentamer, but when concentrated solutions are used only the perfluoroalkyl acetic acid is found in the reaction products. The ketone can in fact be changed into the acid by treating it with concentrated solutions of the hydroxides. The amount of alkali metal hydroxide required for the reaction is usually from four to ten moles per mole of oligomer.

The reactions proceed satisfactorily at moderately elevated temperatures, preferably from 25°C to 100°C. They are exothermic and little applied heat is required. After the initially vigorous reaction has subsided it is convenient to reflux the reaction mixture for a period. If a small proportion of an organic solvent is present, for example about 10% by volume of the reaction mixture, the exothermic reaction tends to initiate more readily. Suitable organic solvents include dimethyl ethers of ethylene glycol and of diethylene glycol and t-butanol.

The ketene and ketone are separated from the products of the reaction between hexamer and alkali metal hydroxide by fractional distillation. The ketene is collected in the fraction boiling at 155°–162°C and the ketone in the fraction boiling at 162°C–180°C, ketene and ketone are then isolated from their respective fractions by gas-liquid chromatography.

The tetrafluoroethylene oligomer derivatives of the invention are useful intermediates, particularly in the preparation of surfactants, and of oleophobic compounds for application to textiles and to other surfaces. For example the perfluoroalkylacetic acid $(C_2F_5)_2(CF_3)C.CH_2COOH$ can be esterified with ethanol to give an ethyl ester; or converted into water-soluble salts whose aqueous solutions have low surface-tensions and are useful in aqueous emulsion polymerisations, or reacted with acetylene to give a vinyl ester that can be polymerised to give fluorocarbon polymers soluble in solvents such as benzotrifluoride and 1,1,2-trifluoro-1,2,2-trichloroethane to give solutions that impart oleophobic and hydrophobic properties to textiles and leather when applied thereto. The vinyl ester can also be copolymerised with polymerisable monomers, for example butyl methacrylate, to give copolymers soluble in chlorinated solvents and possessing film-forming properties.

The perfluoroalkylmethyl trifluoromethyl ketone, $(C_2F_5)_2(CF_3)C.CH_2COCF_3$, can be reduced to the corresponding secondary alcohol which can be esterified with acrylic acid to give an acrylate which has been polymerised to polymers soluble in fluorinated solvents and possessing oleophobic and hydrophobic properties. The secondary alcohol can also be sulphonated to give a surfactant.

The alcohol formed from the tetramer, analytical data for which are consistent with the formula $(C_2F_5)(CF_3)C(OH)CH=CF_2$, that is to say a tertiary alcohol, can be acrylated to give, after polymerisation, oleophobic and hydrophobic polymers, and can be sulphonated to give a surfactant.

The ketone formed from the hexamer is surprisingly stable, as shown by its isolation from aqueous alkaline solution, presumably owing to steric hindrance. With ethanol it reacts to give the ethyl ester of the corresponding acid, and it can react with hydroxyethyl methacrylate to give a polymerisable monomer. The ketone formed from the hexamer is analogous to that formed from the pentamer and behaves as an intermediate in the same types of reactions.

EXAMPLE 1

Tetrafluoroethylene pentamer (50 g.) was added slowly to a stirred solution of potassium hydroxide (40 g.) in water (40 mls.) and dimethyl ether of diethylene glycol (5 mls.). The vigorous exothermic reaction was controlled by the rate of addition of pentamer. When all the pentamer had been added, the still strongly alkaline solution was heated under reflux for 1 hour.

The reaction mixture was then cooled, acidified with sulphuric acid, and extracted with ether. The ether extract was dried and distilled to give the acid, b.pt. 110°C at 18 mm. Hg which solidified on standing (yield 26.0 g.). infra-red and mass-spectra and nuclear magnetic resonance spectra were consistent with the product being the perfluoroalkylacetic acid, $(C_2F_5)_2(CF_3)C.CH_2COOH$.

EXAMPLE 2

Potassium hydroxide (1000 g.) in water (1000 mls.) was stirred at 80°C in a 5-litre flask fitted with a water condenser, dropping funnel and internal thermometer. Tetrafluoroethylene pentamer (1000 g.) was added slowly at such a rate as to maintain steady reflux without the application of external heat. When the addition was complete, the mixture was stirred and heated under reflux for 1½ hours. On cooling to room temperature, the potassium salt of the acid separated and was filtered off. The filtered salt was dissolved in hot water, acidified with sulphuric acid and cooled in ice. The acid separated out as a lower liquid layer which solidified and was filtered off. Recrystallisation from acetone gave 530 g. of the acid, $(C_2F_5)_2(CF_3)C.CH_2COOH$), m.pt. 57°C.

| Found : | C, 25.2%; | H, 0.9%; | F, 65.2% | by weight. |
| Calculated for $C_8H_3F_{13}O$ : | C, 25.4%; | H, 0.8%; | F, 65.3% | by weight. |

EXAMPLE 3

Tetrafluoroethylene pentamer (100 g.) was added slowly to a stirred solution of sodium hydroxide (40 g.) in water (250 mls.) and dimethyl ether of diethylene glycol (10 mls.). The exothermic reaction was controlled by the rate of addition of pentamer. When all the pentamer had been added, the reaction mixture was stirred at 90°C for 1 hours, and was then allowed to cool. A small lower layer (unreacted pentamer, 10 g.) was separated, and the aqueous layer was then acidified with sulphuric acid. The lower layer which separated was run off, dried over magnesium sulphate, and distilled to give the ketone, b.pt. 127°–128°C. The product (60 g.) gave a single peak on a gas-liquid chromatogram, and showed a strong carbonyl absorption at 5.6 microns and very strong C-F absorption at 8.0–8.5 microns. Infra-red spectra, elemental analysis, mass-spectra and nuclear magnetic resonance measurements were consistent with the product being the ketone $(C_2F_5)_2(CF_3)C.CH_2COCF_3$.

EXAMPLE 4

Sodium hydroxide (200 g.) in water (2 litres) was added slowly to a vigorously stirred mixture of pentamer (500 g.) and dimethyl ether of diethylene glycol (20 mls) at 40°C. The rate of addition of sodium hydroxide solution was adjusted to maintain a temperature of about 45°C with slight external cooling. After completion of the addition (3 hours) the reactants were stirred at 45°C for a further 30 minutes.

The reaction mixture was cooled, and the lower layer (unreacted pentamer 56 g.) was separated. Acidification of the aqueous layer with sulphuric acid gave 340 g. of the ketone, $(C_2F_5)_2(CF_3)C.CH_2COCF_3$, b.pt. 127°–128°C.

| Found : | C, 25.6% | H, 0.5%; | F, 71.2% | by weight. |
| Calculated for $C_9H_2F_{16}O$ : | C, 25.1% | H, 0.5% | F, 70.7% | by weight. |

EXAMPLE 5

Sodium hydroxide (16 g.) in water (160 mls.) was added dropwise to a vigorously stirred mixture of tetramer (40 g.) and dimethyl ether of diethylene glycol (4 mls.) at room temperature. An exothermic reaction began and the temperature rose to 35°–40°C. When all the alkali had been added, stirring was continued at 40°C for a further hour, after which the reaction mixture was cooled. A lower layer (10 g.) of unchanged tetramer separated. The aqueous layer was acidified to give a lower layer, which was separated (20 g.). Distillation of this layer gave a fraction b.pt. 79°C, weight 8 g.

| Found : | C, 25.2% | H, 1.1%; | F, 68.4% | by weight. |
| Calculated for $C_6F_{10}H_2O$ : | C, 25.7% | H, 0.7%; | F, 67.9% | by weight. |

Infra-red absorption spectra, mass-spectra and nuclear magnetic resonance data were consistent with the structure

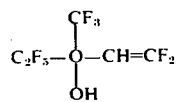

A small amount of a fraction boiling at 83°C was possibly the ketone

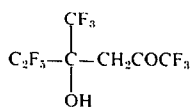

EXAMPLE 6

Sodium hydroxide (64 g.) in water (640 mls.) was added slowly to a vigorously stirred mixture of hexamer (mixed isomers, 200 g.) and dimethyl ether of diethylene glycol (10 mls.) heated to 80°C. On completion of the addition (2 hours) the reaction temperature was raised to 90°C for a further 3 hours, after which the reaction mixture was allowed to cool. It was then acidified, and the lower layer separated. Fractionation of this layer (160 g.) gave some unchanged hexamer (isomers), together with a mixture of products.

The fraction b.pt. 155°–162°C (100 g.) contained one main component which was separated by gas-liquid chromatography and characterised by infra-red absorption spectra mass-spectra and nuclear magnetic resonance data as the ketone

The fraction b.pt. 162°–180°C (30 g.) contained a further main component which was separated by gas-liquid chromatography and characterised as the ketone $(C_4F_9)(C_2F_5)(CF_3)CCH_2COCF_3$.

On refluxing the ketene (10 g.) with an excess of dry ethanol (10 mls.) the ketene peak in the infra-red absorption spectrum slowly disappeared ($4.7\mu$) to be replaced by an ester peak at $5.65\mu$.

Infra-red absorption spectra, mass-spectra and micro-analysis confirmed the product to be the ethyl ester

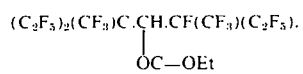

What we claim is:

1. A process for making the perfluoroalkylmethyl trifluoromethyl ketone, $(C_2F_5)_2(CF_3)C.CH_2COCF_3$, comprising reacting at 25° to 100°C. tetrafluoroethylene pentamer which is internally unsaturated and branched chain and has the emperical formula $(C_2F_4)_5$ with an aqueous solution of an alkali metal hydroxide selected from sodium hydroxide and potassium hydroxide containing from 5 to 15% by weight of the alkali metal hydroxide.

2. The perfluoroalkylmethyl trifluoromethyl ketone having the molecular formula $(C_2F_5)_2(CF_3)C.CH_2COCF_3$ and being a liquid boiling at 127°C–128°C under atmospheric pressure.

3. The perfluoroalkylmethyl trifluoromethyl ketone having the molecular formula $(C_4F_9)(C_2F_5)(CF_3)C.CH_2COCF_3$.

* * * * *